US008498959B2

(12) United States Patent
Almeida et al.

(10) Patent No.: US 8,498,959 B2
(45) Date of Patent: Jul. 30, 2013

(54) POLICY ENFORCEMENT

(75) Inventors: Kiran Joseph Almeida, Kamataka (IN); Viji Kakkattu Ravindran, Kamataka (IN); Birur Keshavarao Sudhanva Bhandolkar, Kamataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 631 days.

(21) Appl. No.: 12/626,882

(22) Filed: Nov. 28, 2009

(65) Prior Publication Data

US 2011/0078107 A1 Mar. 31, 2011

(30) Foreign Application Priority Data

Sep. 29, 2009 (IN) ........................... 2369/CHE/2009

(51) Int. Cl.
*G06F 17/00* (2006.01)

(52) U.S. Cl.
USPC ........................................................... 706/55

(58) Field of Classification Search
USPC ........................................................... 706/55
See application file for complete search history.

(56) References Cited

PUBLICATIONS

Jahnert et al ("The Akogrimo Mobile Grid Reference Architecture—Overview" last modified Nov. 2006).*
Tsai et al ("A policy enforcement framework for verification and control of service collaboration" Sep. 2007).*
Hetzer et al ("Policy based resource management for QoS aware applications in heterogeneous network environments" Aug. 2007).*
Xu et al ("Applying Semantic Web Services to Automate Network Management" 2007).*
Leonidas Lymberopoulos ("An Adaptive Policy Based Framework for Network Management" Oct. 2004).*
Alberto Sardinha, Jinghai Rao, Norman Sadeh, Enforcing Context-Sensitive Policies in Collaborative Business Environments, 2007.
Jos De Bruijn, Christoph Bussler, John Domingue, Dieter Fensel, Martin Hepp, Web Service Modeling Ontology (WSMO), Oct. 21, 2006, D2v1.3.

* cited by examiner

*Primary Examiner* — Lut Wong

(57) ABSTRACT

An enforcement system may include a policy decision point and an adaptive grid. Requests for service from users are passed to the policy decision point which uses enforcer agents in the adaptive grid to enforce policies by selecting from available policy enforcement points. The adaptive grid may also include explorer agents for evaluating enforcement capabilities available to the enforcement system.

14 Claims, 5 Drawing Sheets

POLICY ENFORCEMENT

RELATED APPLICATIONS

Benefit is claimed under 35 U.S.C. 119(a)-(d) to Foreign application Serial No. 2369/CHE/2009 entitled "POLICY ENFORCEMENT" by Hewlett-Packard Development Company, L.P., filed on 29 Sep. 2009, which is herein incorporated in its entirety by reference for all purposes.

BACKGROUND ART

The modern business environment is far from homogenous, and may be littered with a variety of heterogeneous policy enforcement points. These enforcement points may be either hardware based enforcement points such as XML Appliance or software counterparts such as a service intermediary enforcing default or custom policies at runtime. Each type of enforcement point has its own strength and weakness.

Hardware based approaches may use accelerators tweaked and optimized to process huge volumes of data. Some activities that may be carried out such as encryption or decryption and signature verification which are costly in terms of resources can therefore frequently better be carried out in hardware than software.

Such hardware based approaches may however be limited when it comes to extensibility, and in particular, for example, to defining and enforcing custom policies. This can be a difficulty when enforcing runtime governance in distributed service oriented architecture solutions using hardware based approaches.

The issue of service level agreement (SLA) enforcement may also be addressed. For a given service, a service provider may have a variety of service level agreements with different users and groups. The service provider may need to monitor and enforce these agreements using runtime policies configured to track and generate data to verify compliance with agreed terms. Different policy enforcement points may typically vary in their ability to enforce policies.

In brief, policy enforcement may involve considerable heterogeneity in a number of respects.

BRIEF DESCRIPTION OF DRAWINGS

For a better understanding of the invention, embodiments will be described, purely by way of example, with reference to the accompanying drawings, in which.

The figures are schematic and not to scale. The same or similar components are given the same reference number in different figures and the description relating thereto is not necessarily repeated.

DETAILED DESCRIPTION

Figure 1:
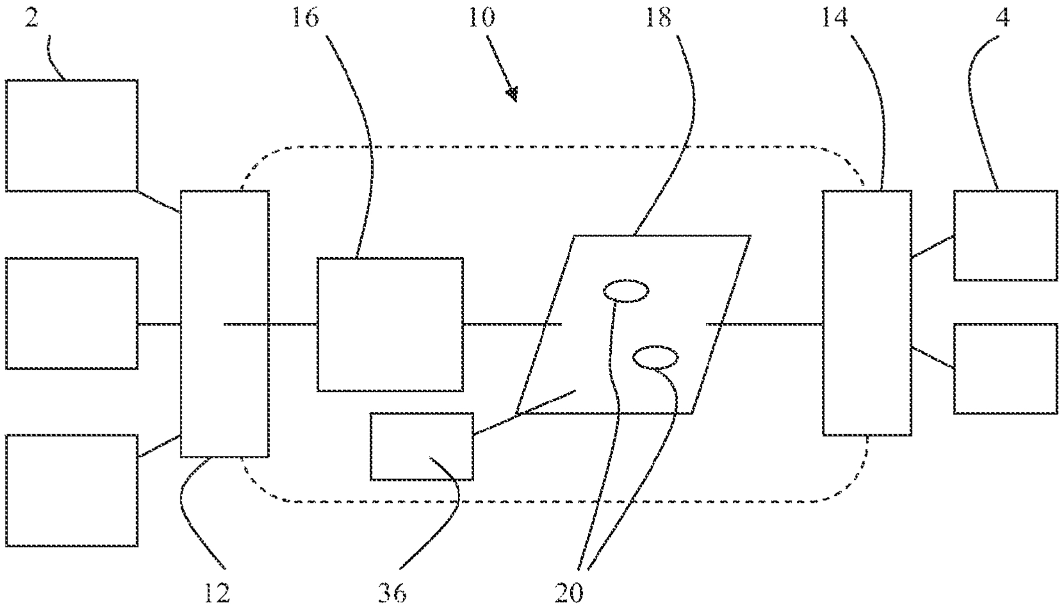
FIG. 1 shows a schematic block diagram of an embodiment.

In a specific example embodiment shown in FIG. 1, an enforcement system 10 is arranged to mediate between one or more users 2 and one or more services 4.

The enforcement system 10 is connected to a virtual service interface 12 which is exposed to the outside world, including users 2, for consumption. A service interface 14 is provided between the enforcement system 10 and the services 4. This protects the actual services 4 from direct access by consumers and ensures that messages pass through the enforcement system.

The enforcement system 10 includes a policy decision point 16, and an adaptive policy grid 18.

Figure 2:
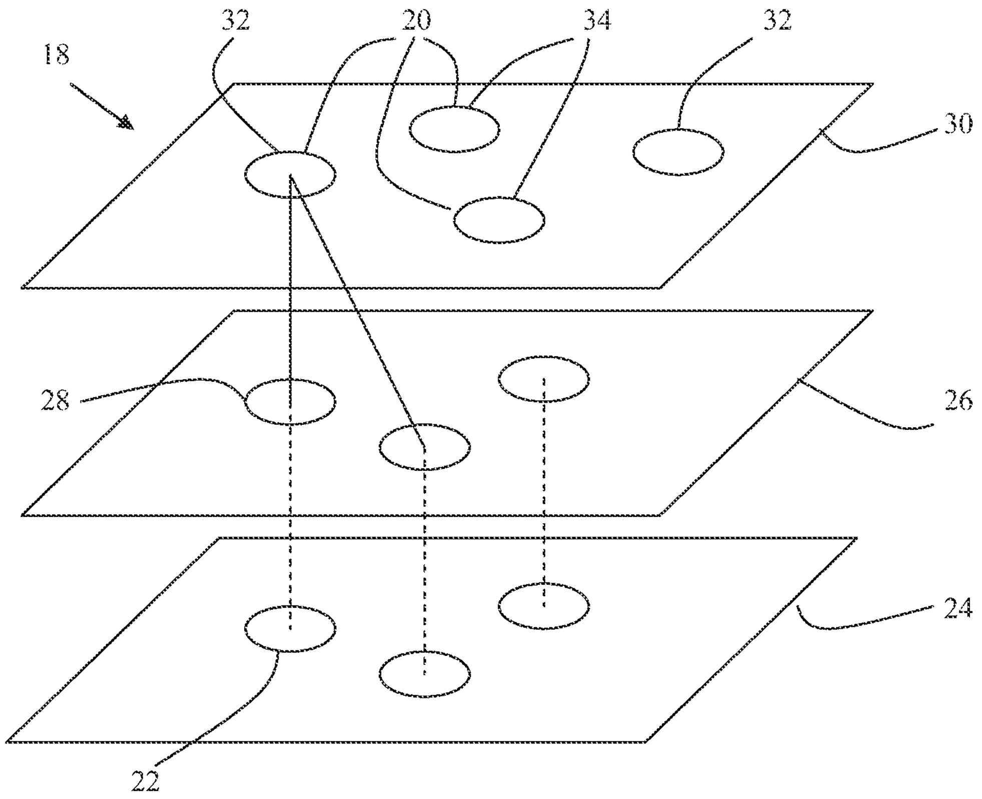
FIG. 2 is a more detailed diagram of part of the embodiment of FIG. 1.

As illustrated in FIG. 2, which represents the adaptive policy grid 18, this is a multi-agent system where a plurality of agents 20 cooperate to enforce policy using policy enforcement points (PEPs) 22.

The collection of PEPs 22 cooperate to enforce governance. The system described has the capability of dealing with a heterogeneous collection of PEPs 22, i.e. PEPs 22 that are not all identical. Note that even where two different PEPs can enforce the same policies, their ability to do this quickly and efficiently may vary and the system can use such heterogeneity as an advantage to optimise policy enforcement. Information about the PEPs is stored in an Enforcement Knowledge base (e-KB) 36 (FIG. 1).

As indicated above, modern enterprise environments can be very heterogeneous, and large scale enterprise systems can include multiple policy enforcement points. Some of these may be hardware based, using XML appliance, for example, and others may be software counterparts for example a service intermediary enforcing default or custom policies at runtime. Each such method has its own strengths and weakness.

Consider for example two different types of PEPs—Type 1 PEPs and Type 2 PEPs, both of which are capable of enforcing two different types of policies, Policy-A and Policy-B. Assume PEP Type 2 is better placed to enforce Policy-B than PEP Type 1.

The example takes account of this information and does not simply sequentially enforce policies without reference to the differing capabilities.

The differing PEPs 22 are present in enforcement layer 24. A semantic web services layer 26 sits on top of the enforcement layer and exposes the capabilities of the PEPs 22 as respective semantic web services 28. This allows the PEPs 22 to be discovered and consumed by agents. The linkage between the PEPs 22 and the respective semantic web services is represented as a dotted line in FIG. 2.

Another layer, the agent layer 30, sits above the semantic web services layer 26. The agent layer includes the plurality of agents 20 which interact with the semantic web services 28 in the semantic web services layer. FIG. 2 illustrates one of the plurality of agents 20 interacting with two semantic web services 28 by solid lines.

The agents 20 symbolize autonomous goal driven intelligent software components that are capable of interacting and coordinating with one another. Agents are well suited to oversee policy enforcement in a heterogeneous environment in which the PEPs are not all the same. The agents may be specified in the format defined by the Foundation for Intelligent Physical Agents (FIPA) to define the components needed. Those skilled in the art will realize that alternative formats may also be used.

The agents 20 are divided into enforcer agents 32 and explorer agents 34 with different functions.

The enforcer agents 32 are primarily responsible for evolving ways of enforcing runtime policies and overseeing the execution of them by the PEPs, and the explorer agents 34 are responsible for evaluating the policy enforcement capabilities in the enforcement system. Both types of agents interact with the semantic web services 28 in the semantic web services layer.

The policy grid 18 is highly adaptable as a result of the cooperation between explorer agents and enforcer agents. When a new PEP 22 is introduced into the system, the explorer agents 34 discover the capabilities of the new PEP, using the information in the semantic web services 28, and update the enforcement knowledge base 36 appropriately with information about the newly discovered capabilities. Thus, the enforcement knowledge base 36 serves as a repository of the capabilities present in the enforcement system.

Accordingly, when a new PEP is introduced into the system, its presence is simply registered in the enforcement knowledge base 36 from then, the explorer agents update the information and capabilities. The information is present in the semantic web services layer which is modelled using a Web Service Modelling Ontology (WMSO) approach which defines precondition, post-condition and other effects in an ontological format. Further details of this approach are contained in the definitions from the Web Service Modelling Ontology working group.

The use of the ontological format allows the explorer agents 34 and enforcer agents 32 to process the information and identify, analyse and invoke the capabilities offered.

Figure 4:
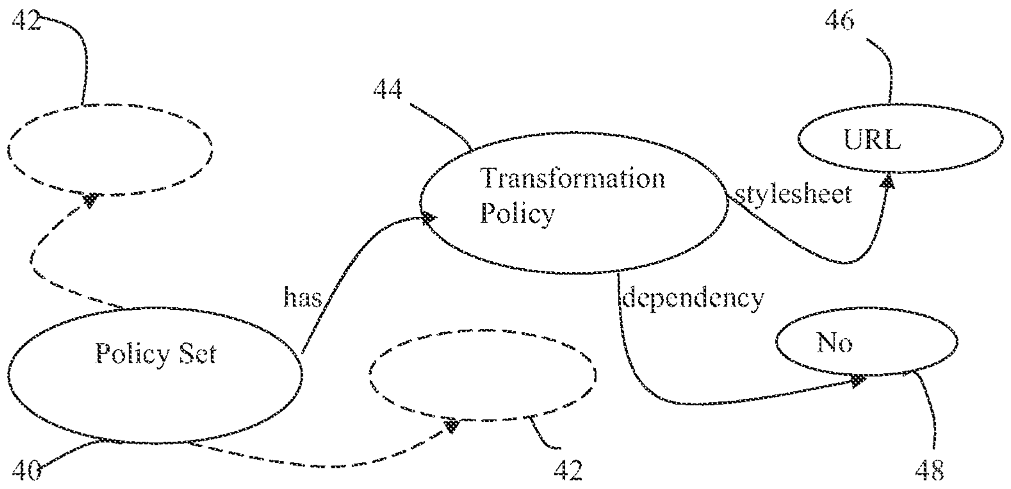
FIG. 4 is a schematic diagram illustrating the representation of policies.
Figure 3:
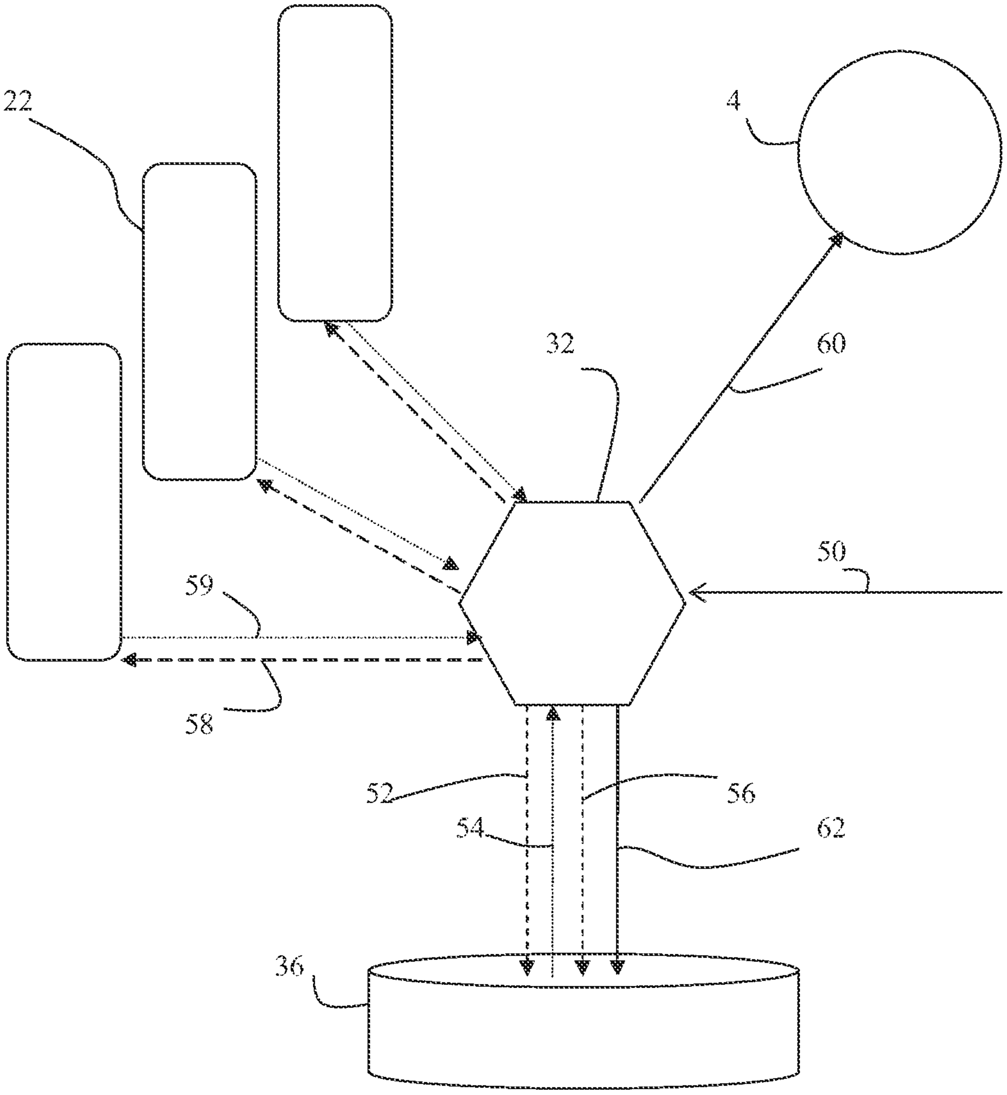
FIG. 3 is a schematic diagram illustrating the invocation of a service.
Figure 5:
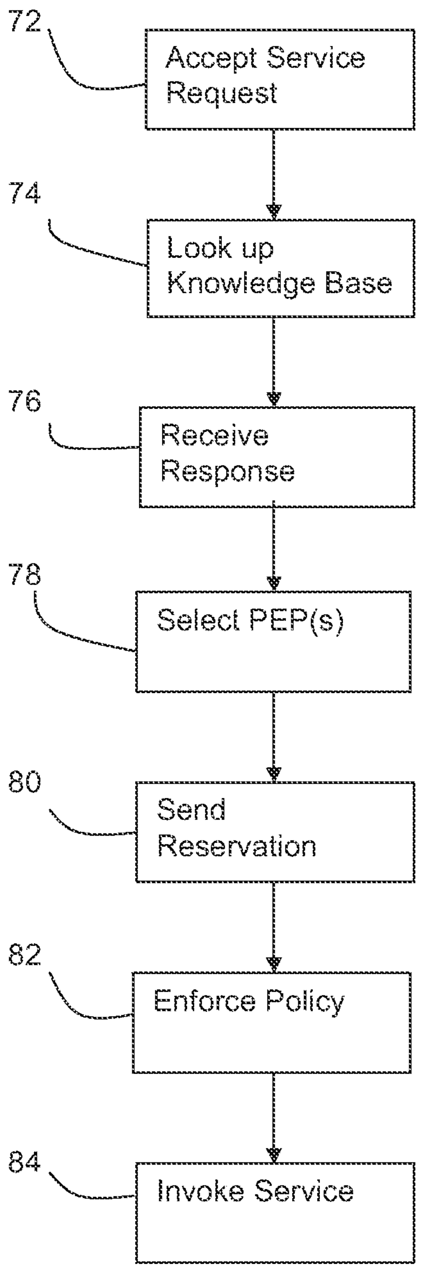
FIG. 5 is a flow chart illustrating the invocation of a service.

The way in which the system responds to a service request is illustrated in FIG. 3 and in the flow chart of FIG. 5; details of the knowledge representation used in this example are illustrated in FIG. 4.

A message arrives through virtual service interface 12 and policy decision point 16. The policy decision point 16 passes a service request message 50 to an enforcer agent 32, which accepts the message (step 72). The service request message 50 includes the message that needs to be processed and information about the policies that need to be enforced for the given message.

Thus, to generate the service request message 50, the policy decision point needs to convey the information about what policies need to be enforced for the given request by the enforcer agent. The policies have attributes that contain information needed to optimize and enforce the given policies. This information is communicated in ontological format by policy decision point to the enforcer agent. The ontological format is illustrated in FIG. 4.

The policy decision point (PDP) 16 decides which policies are to be enforced for a given request, whereas the enforcer agent 32 actually enforces the policies on the policy grid.

When asked to enforce the policy; the enforcer agent 32 answers the following queries:

1) What are the policies that I need to enforce?

2) Do I have all the information to enforce the policies?

3) Can I optimize the enforcement of the policies?

In order to satisfy these requirements, the PDP 16 communicates the information regarding the policies to enforce in a meaningful way to the enforcer agent 32. Ontologies are well suited for knowledge representation, they represent information in machine understandable format and support logical reasoning, therefore all the information needed to enforce the policies is captured in ontological format and send to the enforcer agent. This enables intelligent software components like the enforcer agent 32 to analyze the information (referred as enforcement data) and draw conclusions. This mechanism is allows the enforcer agent to act autonomously while enforcing the policies.

Consider an example where a policy decision point communicates that three policies need to be enforced, in particular a "Transformation Policy" which enforces a policy relating to the transform of the message from one format to another.

The policy set 40 has three policies, indicated by arrows "has", the three policies including the Transformation Policy 44 and two other policies 42 and their corresponding information indicated by the dotted ellipses. So when an enforcer agent 32 queries the policy set for policies, it is made aware that three policies need to be enforced.

The enforcer agent 32 drills down to each of these policies 42,44, analyzes the policy and extracts the information to enforce each of the policy. Additionally the enforcer agent 32 also obtains the execution sequence of the policy, for example whether the policies can be executed in parallel.

The execution sequence information is captured using the "dependency" attribute of the Transformation Policy, which in the example has a value "no", indicated that the Transformation Policy can be executed in parallel to the other policies 42 represented.

The Transformation Policy will ultimately be enforced by a Transformation Policy enforcement unit, in one of the policy enforcement points 22, which transforms the message from one format to another. To enforce transformation policy, a Transformation Policy enforcement unit uses two type of inputs:

1) The message to be transformed, and 2) a style sheet to be used in transforming the message.

This is done using an EXtensible Stylesheet Language, a language that contains instruction on how to transform an XML (Extensible Markup Language) message. This style sheet can be hosted on a server and made available through a Uniform Resource Locator (URL) so that anyone who wants to use it can do so.

Returning to FIG. 4, and the discussion of how information is represented, the "stylesheet" attribute 46 of the Transformation Policy 44 accordingly contains this URL to represent and communicate this information.

Thus the enforcer agent 32 has all the information to go about its task, represented ontologically. To process a service request message requiring it to enforce the three policies illustrated including the transformation policy, it obtains the information regarding the location of the style sheet that is used to transform the message and it is also aware that it can optimize this enforcement by executing this policy in parallel with other policies.

Similar logic gets applied for other policies as well.

Returning to FIG. 3, after receiving the service request message, and determining which policies need to be enforced, the enforcer agent 32 then looks up the enforcement knowledge base 36 (step 74) by sending knowledge base query 52 and receives a response 54 with the requested information (step 76). Based on the response 54, the enforcer agent 32 selects one PEP or multiple PEPs 22 that is or are best placed to enforce the policy given the information in the enforcement knowledge base (step 78). In the illustration, three PEPs 22 are selected.

The enforcer agent reserves the capability of the selected PEP 22 in the enforcement knowledge base 36 by sending reservation query 56 (step 80) and executes the corresponding semantic web service 28 to enforce the policy (step 82). This is done as illustrated by SWS invocation request 58 and SWS invocation response 59.

The required service 4 is then invoked by service invocation 60 (step 84).

After use, the enforcer agent 32 updates the entry in the enforcement knowledge base 36 by update message 62 to remove the reservation and indicate that the capacity is free for reuse (step 86). The enforcer agent also updates the enforcement knowledge base 36 with enforcement metrics which are used to evaluate the capacity of the selected PEP 22 in comparison with other PEPs. Thus, over time, the enforcement knowledge base 36 builds up information about the capabilities of the various PEPs.

This approach ensures that the system is in a constant state of evolution and superior PEPs 22 are rated higher and higher and get used in preference to less successful PEPs 22. The enforcer agents are programmed in this example to use the highest rated available PEP 22 when selecting an enforcement strategy. Alternative approaches may also include other considerations, such as the location of the PEP 22.

If a PEP 22 drops out of the system and becomes unavailable its capabilities may be removed from the enforcement knowledge base 36. This may be done by either an enforcer agent 32 or an explorer agent 34—if either finds that a particular PEP 22 is unavailable it may be delisted.

Thus, when a request for a service arrives at the enforcement system 10, this is processed by the policy decision point which selects at least one enforcer agent 32 which in turn selects suitable PEPs 22 to carry out the necessary policies to enforce various requirements by consulting the enforcement knowledge base 36, enforcing policies using one or more suitable PEPs 22 and then invoking the required service or services through service interface 14.

Figure 6:
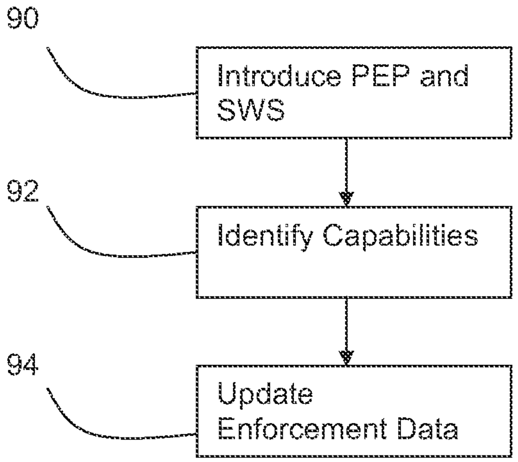
FIG. 6 is a flow chart illustrating the addition of a new enforcement point.

When a new policy enforcement point is input into the system, the system may operate as illustrated in the flow chart of FIG. 6.

A new policy enforcement point 22 and corresponding semantic web service 28 is introduced (step 90) into the policy enforcement system.

An explorer agent 34 then identifies the capabilities of the new policy enforcement point with an explorer agent by querying the corresponding semantic web service (step 92).

The enforcement database 36 is then updated (step 94) with the identified capabilities.

In this way, the enforcement database includes information about the policy enforcement points available in the policy enforcement system.

It will be appreciated that embodiments of the present invention can be realized in the form of hardware, software or a combination of hardware and software. Each of the various components, including in particular the agents, policy enforcement points, and policy decision points may be implemented in hardware or software, and some of these may be implemented in hardware and some in software.

Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing the systems or methods described and a machine readable storage storing such a program. Still further, embodiments of the present invention may be conveyed electronically via any medium such as a communication signal carried over a wired or wireless connection and embodiments suitably encompass the same.

Consider a simple specific implementation. Let us assume that we need to govern a shopping cart service that accepts orders from the customers, the service provider may want to enforce the following runtime policies on messages sent to the service:

Message Integrity Verification Policy: primarily responsible for verifying that the order has not been tampered with.

Transformation Policy: ensure that messages confirming to the older version of the service can be processed by the current service.

Custom Order Alerting Policy (Custom Policy): alert the service provider when a large order is placed, for instance; if an order with value greater than 1000$ arrives at the system, then the service provider may wish to take custom action.

There are two types of PEP are available for policy enforcement, PEP-A, PEP-B of Type-I (say XML Appliance based) and PEP-C of Type-II (software based service intermediary). Although PEP of Type-I&II are capable of enforcing Message Integrity Verification and Transformation Policies, only PEP of Type-II is capable of enforcing Custom Order Alerting Policy. The Message Integrity Verification and Transformation Policy enforcement capability of Type-I PEP is rated higher than Type-II PEP within the e-Knowledge base (e-KB).

When a request is sent to the virtual service, the enforcement system relies on the policy decision point (PDP) to generate a set of policies that are enforced for the given request, in the current example, the PDP identifies that the above three policies need to be enforced and this information along with the data needed to enforce the policies is passed on to the policy grid, for instance, when communicating the Transformation policy, the enforcement data contains a pointer to the stylesheet URL that needs to be used by the enforcement unit to transform the message etc.

Once the message and the enforcement data are sent to the policy grid, one of the enforcer agents is assigned the task to enforce the policies. The enforcer agent does a lookup on the e-KB and identifies the enforcement units capable of enforcing the necessary policies. The attributes contained within the enforcement data help the enforcer agent to optimize policy enforcement, in the current illustration all three policies can be executed independently, however, the transformed message needs to invoke the service; the knowledge needed to arrive at this conclusion is encoded within the enforcement data, thereby providing the enforcer agent with all the information needed to evolve an optimal enforcement strategy.

In the current illustration, only PEP-C has the capability to enforce the custom policy, therefore, the policy enforcement unit of PEP-C is selected to enforce the custom policy, since PEP-A and PEP-B are equally good at enforcing other two policies, the enforcer agent select one the PEP to enforce the message integrity policy and other is asked to enforce transformation policy. The transformed message is used to invoke the service. Similar approaches can be followed for response path policy enforcement.

Note that alternative representations of information may be used instead of or additionally to the ontological representation where required.

Further, those skilled in the art will be aware of other ways of carrying out policies, including the Transformation Policy described in more detail above, and such alternative implementations may be used.

Further, the various components may be implemented in software or hardware, and the number of physical servers and computers may vary. Thus, the complete adaptive policy grid may be implemented in a single workstation, or across a number of devices connected via a local or wide area network.

Those skilled in the art will realise that the specific components described above may frequently be replaced by alternatives. Further, although the explorer agents and enforcement agents are described above as separate agents, in alternative arrangements a single agent may carry out both functions, for example at different times or even at the same time.

The invention claimed is:

1. An enforcement system for enforcing policies with regard to service requests comprising a processor-readable, non-transient medium storing code representing instructions that when executed at a processor cause the processor to implement:

a plurality of enforcer agents adapted to enforce policies;

at least one explorer agent adapted to evaluate policy enforcement capabilities available to the enforcement system; and a policy decision point adapted to identify the policies that need to be enforced for a service request and to pass this information to at least one enforcer agent to enforce the identified policies.

2. An enforcement system according to claim 1, further comprising an enforcement knowledge base, wherein each explorer agent is adapted to store in the knowledge base information about the policy enforcement capabilities available to the enforcement system.

3. An enforcement system according to claim 2, wherein each enforcer agent is adapted to use the information in the enforcement knowledge base to enforce policies.

4. An enforcement system according to claim 3, wherein the enforcer agents are adapted, after using a policy enforcement capability, to update the enforcement knowledge base with information about the policy enforcement capability.

5. An enforcement system according claim 1, wherein the policy enforcement capabilities include a plurality of non-identical policy enforcement points.

6. An enforcement system according to claim 1, comprising a policy grid which comprises:

a policy enforcement layer including a plurality of policy enforcement points;

a semantic web services layer including a plurality of semantic web services corresponding to the policy enforcement points; and an agent layer including the enforcer agents and the at least one explorer agent, wherein the enforcer agents and the explorer agents interact with the semantic web services in the semantic web services layer.

7. An enforcement system according to claim 1, further comprising:

a virtual service interface for accepting service requests and passing them to a policy decision point; and a service interface connected to the policy grid to allow the enforcement system to access at least one service.

8. A method of enforcing policies, comprising:

accepting a service request;

analysing the request by a policy decision point to shortlist a set of policies that need to be enforced for the request;

selecting at least one enforcer agent from a plurality of enforcer agents to enforce policies with respect to the service request and passing information from the service request to the or each selected enforcer agent;

selecting in the or each selected enforcer agent at least one policy enforcement capability to enforce policies with respect to the service request, wherein the selected enforcer agent or agents calculate runtime information including performance metrics for the or each selected enforcement capability and store in a knowledge base information about the performance of the or each selected enforcement capability generated from the runtime information.

9. A method according to claim 8, further comprising:

identifying using at least one explorer agent information about a policy enforcement capability and updating a knowledge base with this information.

10. A method according to claim 9 wherein the step of selecting at least one policy enforcer agent uses the information in the knowledge base.

11. A method according to claim 8 wherein the policy enforcement capabilities include a plurality of non-identical policy enforcement points.

12. A method of operating a policy enforcement system, comprising:

introducing a new policy enforcement point and corresponding semantic web service into the policy enforcement system;

identifying the capabilities of the new policy enforcement point with an explorer agent by querying the corresponding semantic web service; and updating an enforcement database with the identified capabilities, the enforcement database including information about the policy enforcement points available in the policy enforcement system.

13. A method of operating a policy enforcement system according to claim 12, further comprising:

accepting a service request in a enforcer agent;

querying the enforcement database for capabilities of policy enforcement points;

selecting one or more policy enforcement points; and enforcing policies with respect to the service request using the selected policy enforcement point or points.

14. A method according to claim 13, further comprising;

calculating performance metrics about the or each selected enforcement capability to evaluate the performance of the selected policy enforcement point or points and updating the enforcement database with an evaluation of the performance of the selected policy enforcement point or points in enforcing the policies.

* * * * *

UNITED STATES PATENT AND TRADEMARK OFFICE

CERTIFICATE OF CORRECTION

PATENT NO. : 8,498,959 B2
APPLICATION NO. : 12/626882
DATED : July 30, 2013
INVENTOR(S) : Kiran Joseph Almeida et al.

It is certified that error appears in the above-identified patent and that said Letters Patent is hereby corrected as shown below:

In the Claims:

In column 7, line 32, in Claim 5, delete “claim” and insert -- to claim --, therefor.

Signed and Sealed this
Twelfth Day of November, 2013

Teresa Stanek Rea
*Deputy Director of the United States Patent and Trademark Office*